United States Patent
Chen

(10) Patent No.: US 7,493,459 B2
(45) Date of Patent: Feb. 17, 2009

(54) METHOD OF ENHANCING SYSTEM PERFORMANCE APPLICABLE OF COMPUTER SYSTEM CAPABLE OF EXECUTING SNAPSHOT PROCESS

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 263 days.

(21) Appl. No.: 11/364,021

(22) Filed: Feb. 27, 2006

(65) Prior Publication Data
US 2007/0005916 A1 Jan. 4, 2007

(30) Foreign Application Priority Data
Jun. 15, 2005 (TW) ................. 94119778 A

(51) Int. Cl.
*G06F 12/00* (2006.01)
(52) U.S. Cl. ................................ 711/162; 711/E12.04
(58) Field of Classification Search ................. 711/162, 711/E12.04
See application file for complete search history.

(56) References Cited

U.S. PATENT DOCUMENTS

| | | | |
|---|---|---|---|
| 7,257,675 B2 * | 8/2007 | Sakai | 711/114 |
| 2004/0093474 A1 * | 5/2004 | Lin et al. | 711/162 |
| 2005/0086432 A1 * | 4/2005 | Sakai | 711/114 |
| 2006/0265526 A1 * | 11/2006 | Holbrook | 710/52 |
| 2007/0083567 A1 * | 4/2007 | Arai et al. | 707/200 |

* cited by examiner

Primary Examiner—Hyung S Sough
Assistant Examiner—Mehdi Namazi
(74) Attorney, Agent, or Firm—Jianq Chyun IP Office

(57) ABSTRACT

The present invention discloses a method of enhancing system performance applicable to a computer system capable of executing a snapshot process. The method includes counting a number of times the computer system has executed the snapshot process; and if the number is smaller than two, updating data made by the snapshot process executed by the computer system with data that are to be changed in the computer system, or updating data made by latest one of the snapshot processes executed by the computer system with the data that are to be changed in the computer system, instead of updating data made by all the snapshot processes with the data that are to be changed in the computer system, so as to save system resources and increase the system performance of the computer system.

18 Claims, 10 Drawing Sheets

METHOD OF ENHANCING SYSTEM PERFORMANCE APPLICABLE OF COMPUTER SYSTEM CAPABLE OF EXECUTING SNAPSHOT PROCESS

BACKGROUND OF THE INVENTION

1. Field of the Invention

This invention relates to methods of enhancing system performance, and more particularly, to a method of enhancing system performance applicable to a computer system capable of executing a snapshot process for performing snapshots repeatedly.

2. Description of Related Art

One of the most important operations to be executed by a computer system administrator is to make a system backup of data with system parameters such that important data stored in the system can be kept intact and protected from inadvertent loss due to computer crashes, breakdowns, or inappropriate operations. Accordingly, the most effective way is to duplicate a data backup of system parameters from a computer system to the medium of data a storage device so as to save the data outside the computer system (such as an magnetic tape, a disc, or a memory unit) by making a system backup, or to configure an integrated back-up memory unit built in the computer system, thereby enabling the computer system to restore the original data thereof using the system backup in case any destructive problems occur to the computer system. Furthermore, critical system data can also be transmitted to computer systems at different locations or a storage space in a network server.

Among the system duplicating methods that are widely adopted by computer system administrators or users is the snapshot function installed in computer systems, which makes a record of system parameter settings at one or more times when a computer system is operating normally, so as to allow such settings to be rapidly restored in the event that the computer system is invaded by a virus or directed to a malicious web page while surfing the net, thereby maintaining normal functions of the computer system.

The system duplicating method using the snapshot technique is implemented by establishing a snapshot mechanism so that when an application program is initially installed, the important data will first be copied in a snapshot process. In addition, the system will update the block map thereof that has been altered so as to correspond to the changes made to the data and to indicate the location of the image data in a snapshot area.

The foregoing system duplicating method has several main advantages: firstly, it takes only seconds to duplicate system backups of large volumes, and also each system backup is a complete Full File System Backup which can be read or duplicated to a magnetic tape directly; secondly, it allows a system administrator to make dynamic adjustments (enlarge or reduce the size) in the preserved space of the snapshot backups without causing the loss of the snapshot system backup; moreover, it allows a system administrator to make deletion of any snapshot backups at any time without losing the existing snapshot backups; also, a system administrator can freely set the time cycles for performing processes of snapshots at any time according to the requirements. The data-updating process of the system duplicating method will be described later in full detail with respect to the accompanying drawings and descriptions thereof.

When a user starts the snapshot mechanism in a computer system to proceed a snapshot process, as shown in FIG. 1A, the computer system will first establish an index table to identify the system backup data that are to be duplicated by the snapshot process, as shown in FIG. 1B, and each time a user makes changes to the system data 11, the computer system proceeds to make a system backup corresponding to a data block of the index table 10 (as indicated by an arrow in FIG. 1B) according to the change made in the last snapshot process, thereby making a system backup to correspond to any changes made in the system data 11 for users' subsequent processing.

However, in the case that a user of the computer system has executed the snapshot processes, as shown in FIG. 2A, over and over, the computer system still establishes a first index table 12 to identify the system backup data that are to be duplicated by the snapshot process. Next, as shown in FIG. 2B, when a user makes changes to the system data 13, the computer system proceeds to make a system backup corresponding to a data block of the first index table 12 (as indicated by an arrow in FIG. 2B), and, at the same time, as shown in FIG. 2C, when a user starts the snapshot mechanism in a computer system the second time, the computer system will once again establish a second index table 14 to identify the system backup data that is to be duplicated by the snapshot process. Subsequently, as shown in FIG. 2D, when a user makes changes to the system data 13, the computer system proceeds to make a system backup corresponding to the data blocks of the first index table 12 and the second index table 14 (as indicated by an arrow in FIG. 2D). Also, as shown in FIG. 2E, when a user again starts the snapshot mechanism of a computer system, the computer system will establish a third index table 15 to identify the system backup data that is to be duplicated by the snapshot process. Moreover, as shown in FIG. 2F, when a user makes changes to the system data 13, the computer system proceeds to make a system backup corresponding to the data blocks in the first index table 12, the second index table 14, and the third index table 15 (as indicated by the arrows in FIG. 2F). Similarly, once a user makes changes to the system data 13, the computer system proceeds to update all of the data having undergone the earlier snapshot processes, as shown in FIG. 2G.

As such, each time a user starts the snapshot process to make any changes to the system data, the computer system is programmed to make a system backup corresponding to the data block in the index table, thereby inadvertently wasting the resources of the computer system and seriously affecting the system performance and operation as a result, possibly leading to a computer breakdown or crash caused by the insufficient memory.

Therefore, improving on the drawbacks of the prior art that system performance is affected to a great extent due to multiple snapshot processing is a critical issue to resolve.

SUMMARY OF THE INVENTION

It is therefore an objective of this invention to provide a method of increasing system performance which can effectively save system resources to thereby prevent the degradation of performance in computer systems.

Another objective of this invention to provide a method of increasing system performance which can stabilize the state of operations in computer systems to thereby prevent system crashes from occurring due to unsteady operations.

To achieve the above and other objectives, the present invention discloses a method of enhancing system performance applicable to a computer system capable of executing a snapshot process. The method includes counting a number of times the computer system has executed the snapshot process; and if the number is smaller than two, updating data made by the snapshot process executed by the computer system with data that are to be changed in the computer system, or updating data made by latest one of the snapshot processes executed by the computer system with the data that are to be changed in the computer system, instead of updating data made by all the snapshot processes with the data that are to be changed in the computer system, so as to save system resources and increase the system performance of the computer system.

To achieve the above and other objectives, the present invention further discloses a method of enhancing system performance applicable to a computer system capable of executing a data backup process. The method includes counting a number of times the computer system has executed the data backup process; and if the number is smaller than two, updating data made by the data backup process executed by the computer system with data that are to be changed in the computer system, or updating data made by latest one of the data backup processes executed by the computer system with the data that are to be changed in the computer system, instead of updating data made by all of the data backup processes with the data that are to be changed in the computer system, so as to save system resources and increase the system performance of the computer system.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

FIGS. 3, and 4A through 4G depict related views of the method of enhancing system performance according to the invention, the detailed description thereof being given with respect to the accompanying diagrams to illustrate the preferred embodiments of the invention. Note that the drawings are simplified schematic views which show only the basic structure and related parts of the invention for clarify and brevity.

Figure 1A:
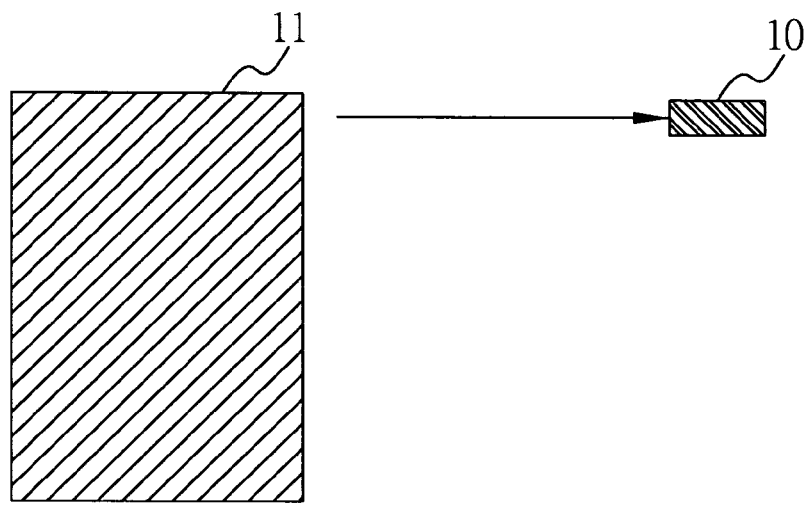
FIGS. 1A and 1B (PRIOR ART) are schematic views showing the change of data structure of a conventional computer system in executing a single snapshot process.
Figure 1B:
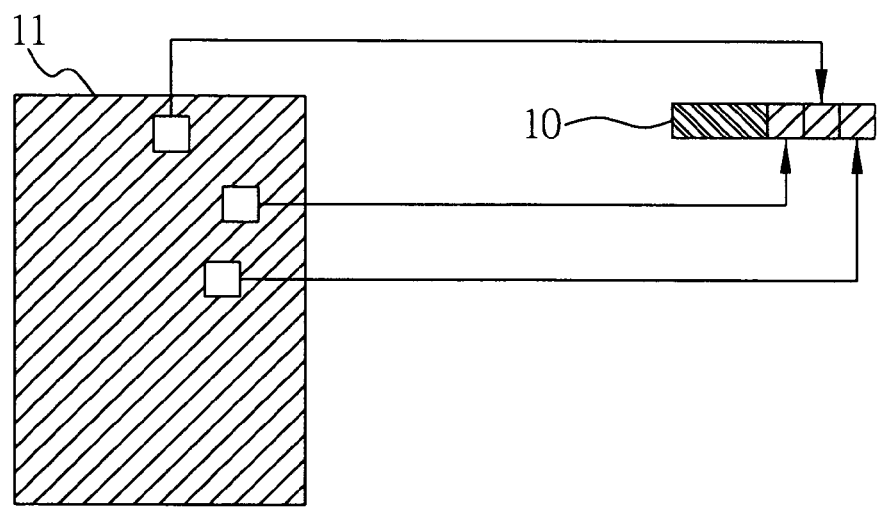
Figure 2A:
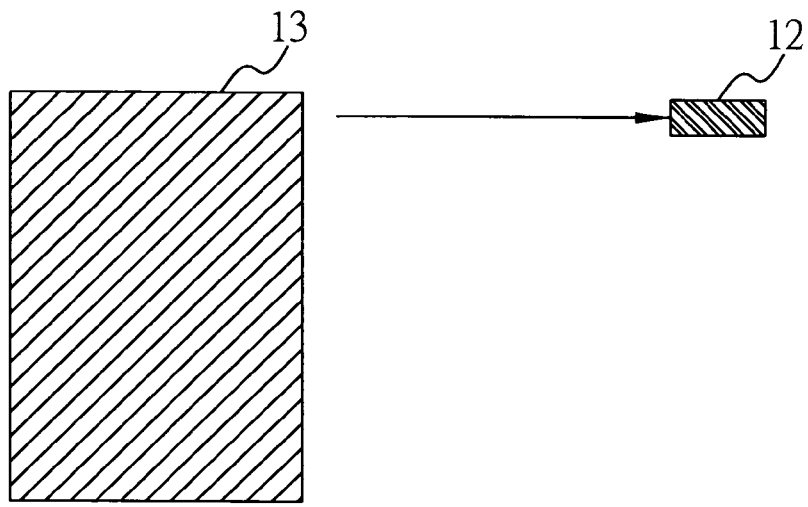
FIGS. 2A through 2G (PRIOR ART) are schematic views showing the change of data structure of a conventional computer system in executing multiple snapshot processes.
Figure 2B:
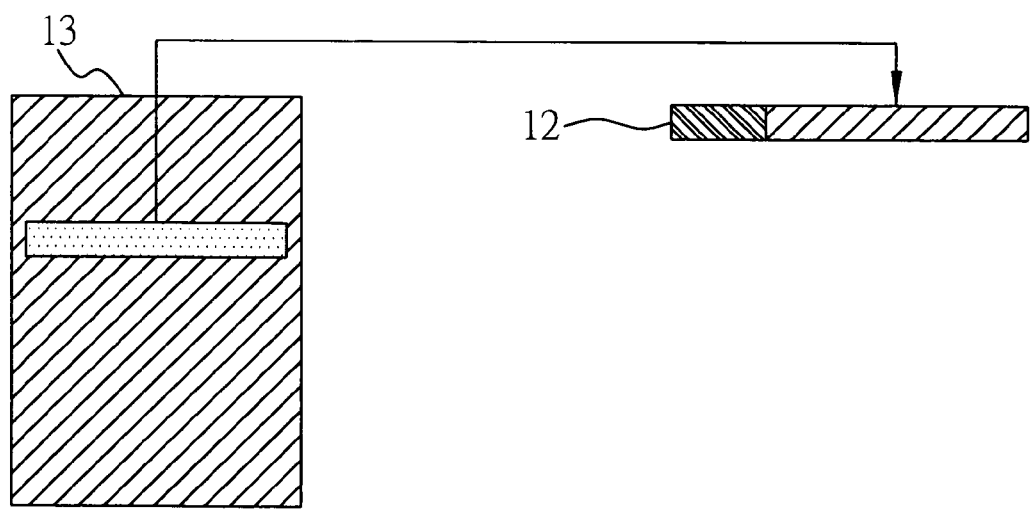
Figure 2C:
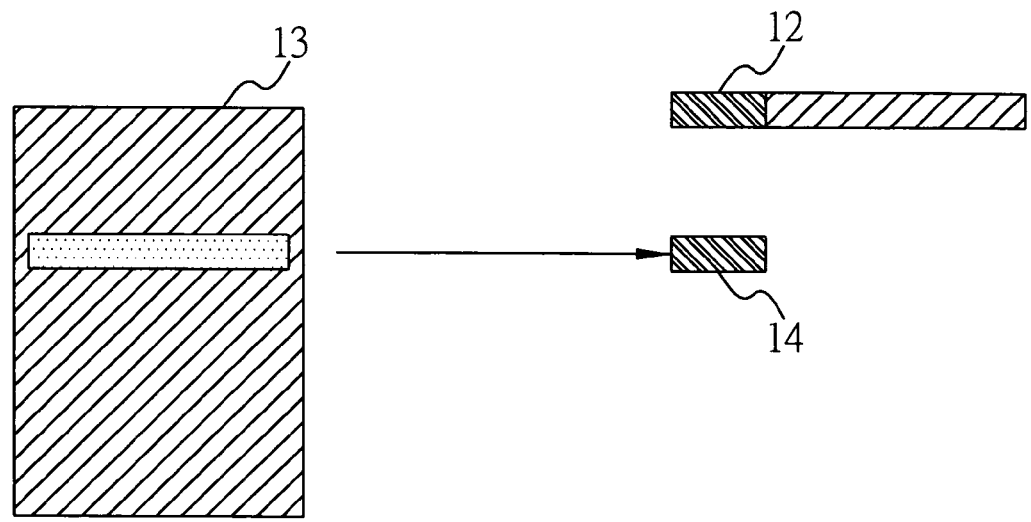
Figure 2D:
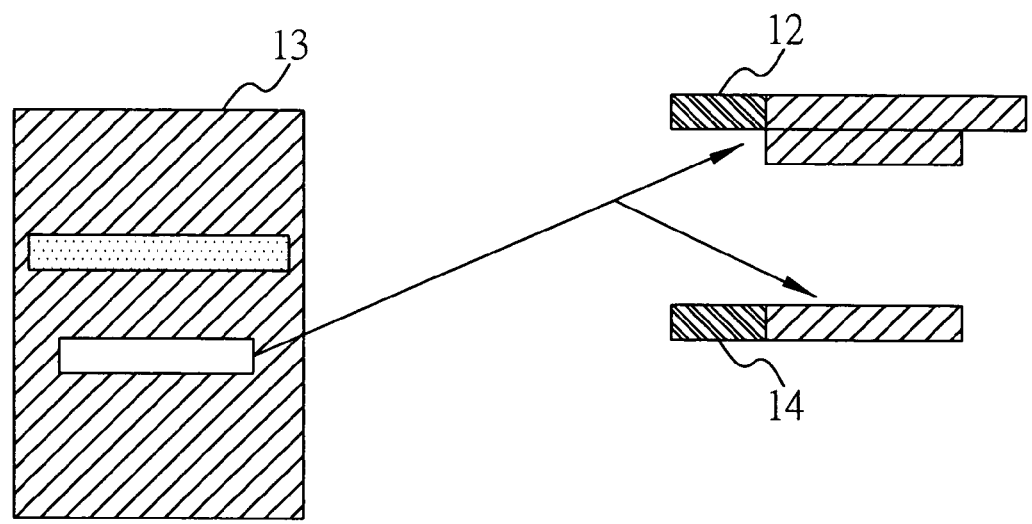
Figure 2E:
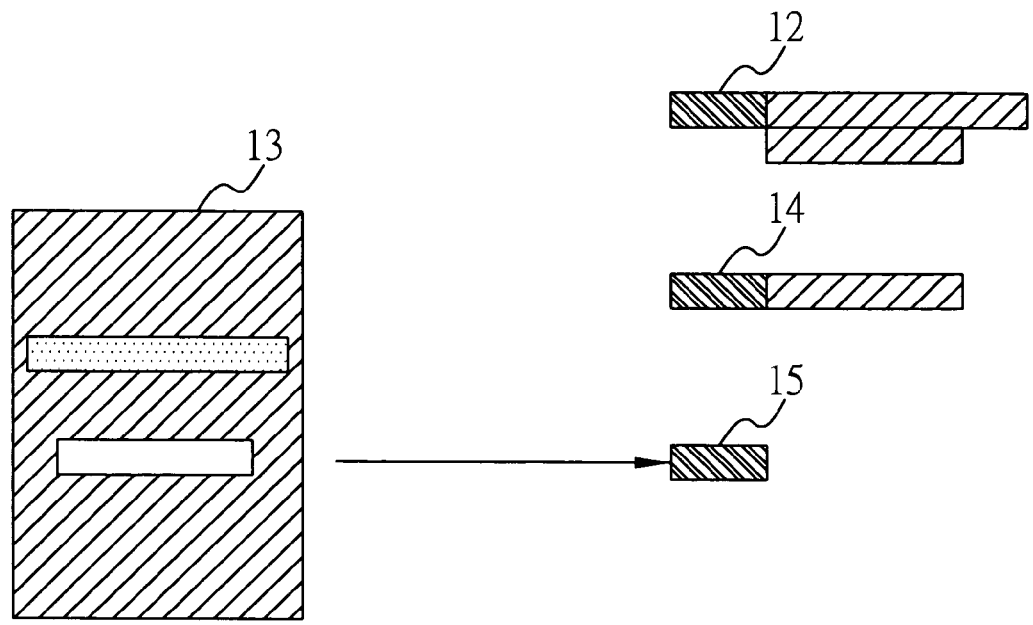
Figure 2F:
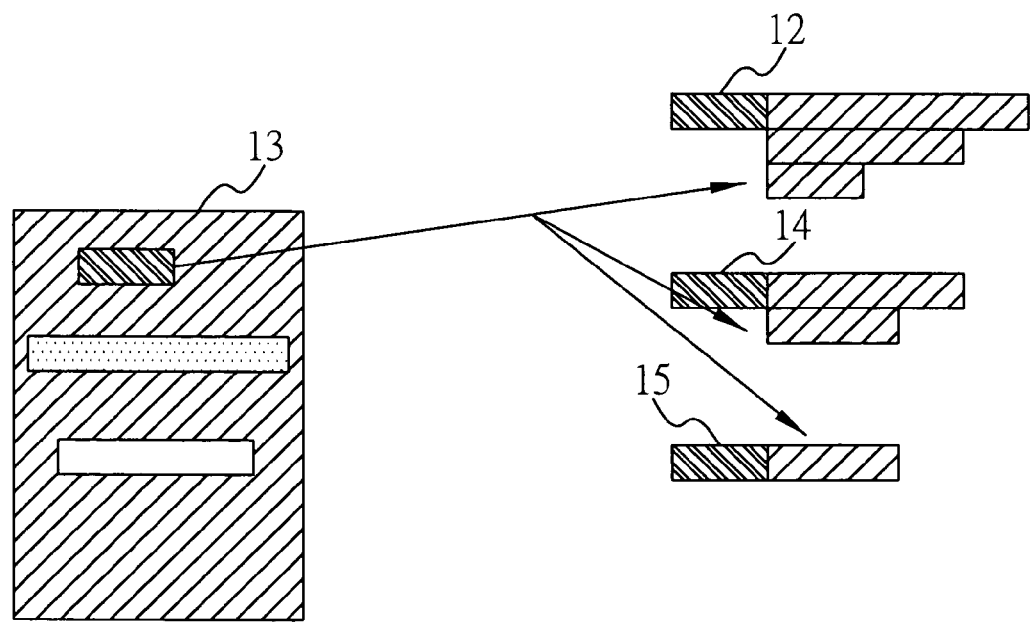
Figure 2G:
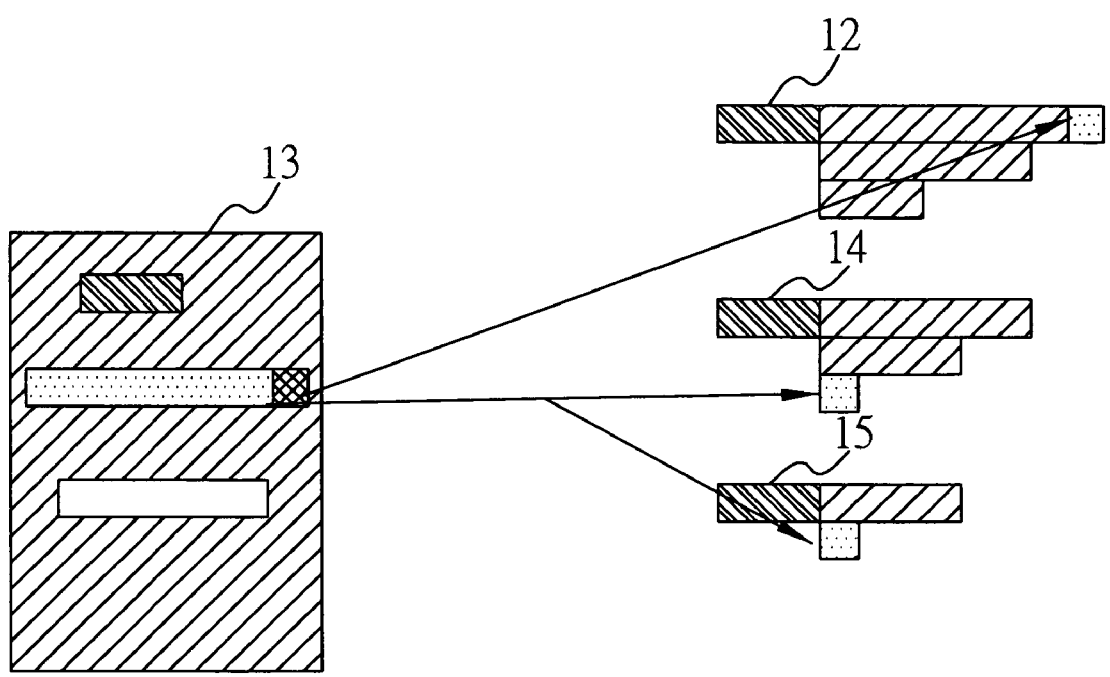
Figure 3:
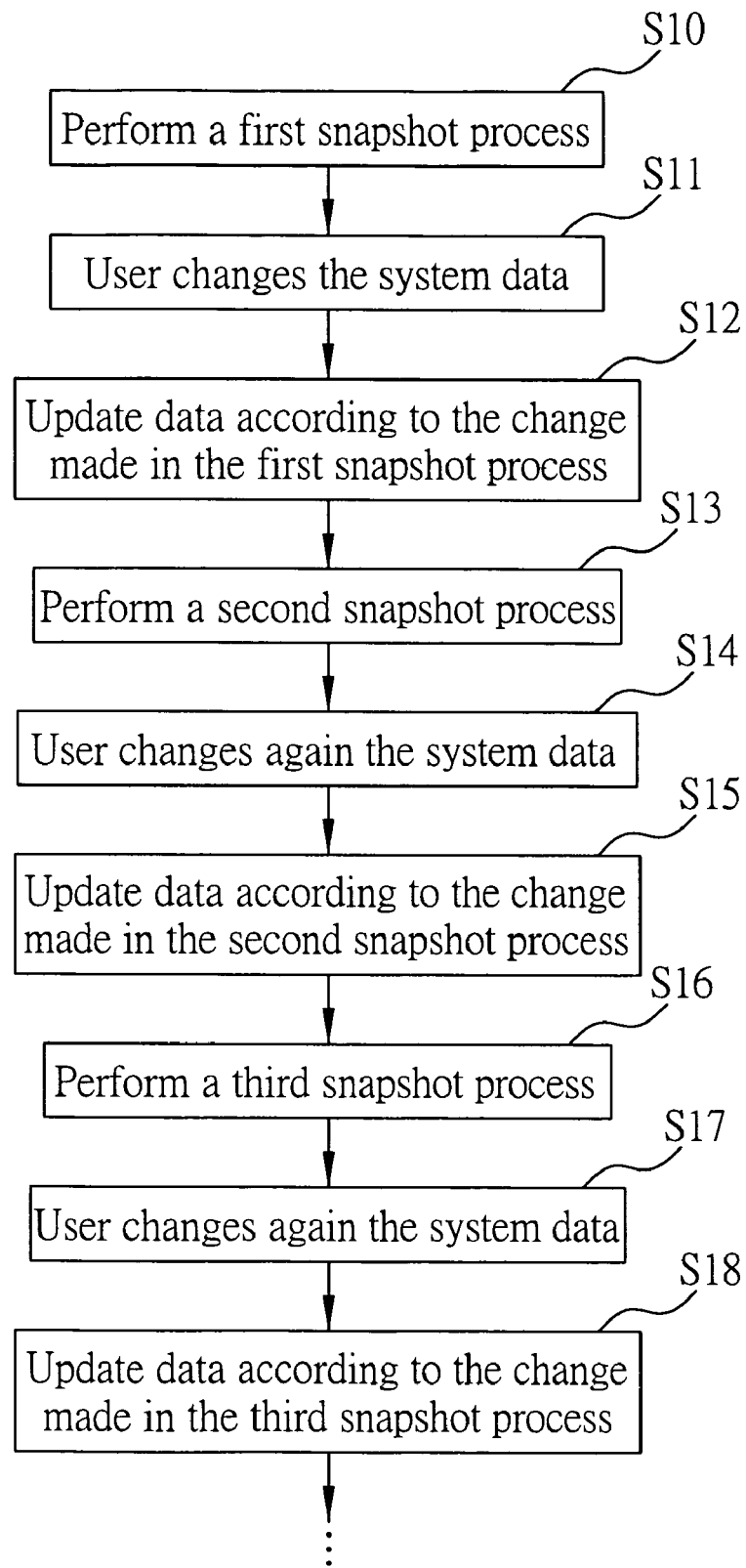
FIG. 3 is a schematic flowchart showing the procedural steps in executing the method of enhancing system performance according to the invention.
Figure 4A:
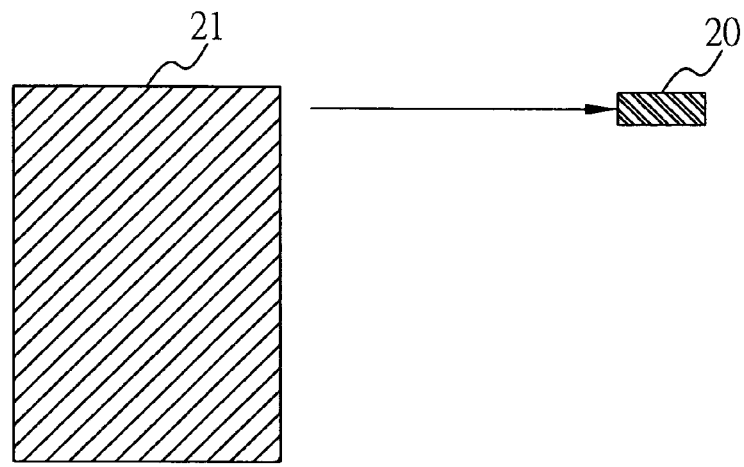
FIGS. 4A through 4G are schematic views showing the change of data structure in executing multiple snapshot processes of a computer system applying the method of enhancing system performance according to the invention.
Figure 4B:
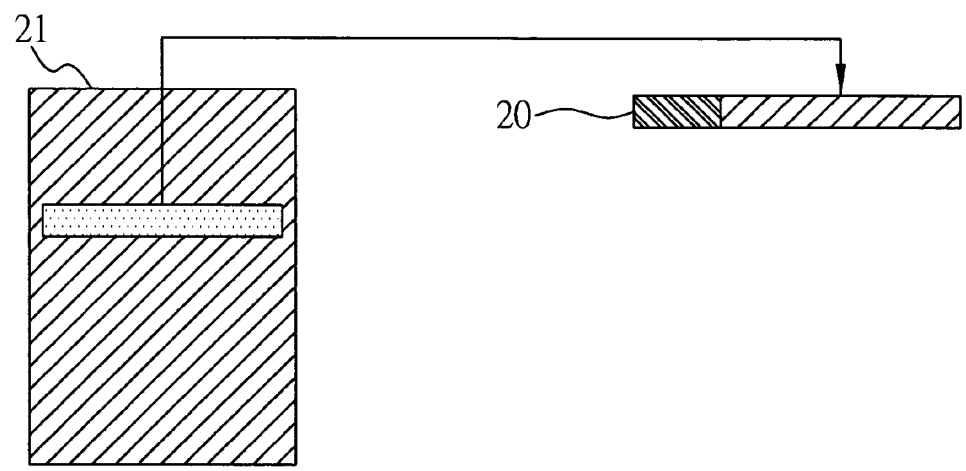

The method of enhancing system performance according to the invention is applicable to a computer system capable of executing a snapshot process. After having executed two snapshot processes, i.e. when a number of times the computer system has executed the snapshot processes is at least two, the computer system is controlled not to update data made by all of the snapshot processes, so as to enhance the system performance. The method of enhancing system performance according to the invention updates data by latest one of the snapshot processes executed by the computer system with the data that are to be changed in the computer system. The computer system comprises notebook computers, desktop computers, servers, and super computers and so on. As shown in the drawing, FIG. 3 illustrates the procedural steps for executing an embodiment of the method of enhancing system performance of the invention; however, it is not intended to limit the applications of the invention in anyway. The method starts in step S10. In step S10, a first snapshot process is executed in a computer system. As shown in FIG. 4A, the computer system first establishes a first index table 20 corresponding to the first snapshot process, so as to identify the first snapshot to be duplicated. The method proceeds to step S11.

In step S11, some of the data in the computer system are changed. Proceed to step S12.

In step S12, the method updates the change of data in the system according to the first snapshot. Step S12 is described with reference to FIG. 4B. After a user makes a change to the data 21 in a computer system, the computer system proceeds to duplicate a system backup according to the first snapshot corresponding to the data block in the first index table 20, and stores the system backup after the first snapshot in a memory unit (as shown by an arrow in FIG. 4B). The memory unit comprises memory units of the computer system, storage devices externally connected to the computer system, or storage spaces of network servers. At this time, the performance of the computer system is not affected since only a system backup is duplicated to correspond to the change made in the first snapshot and only a single snapshot is processed. Then proceed to step S13.

Figure 4C:
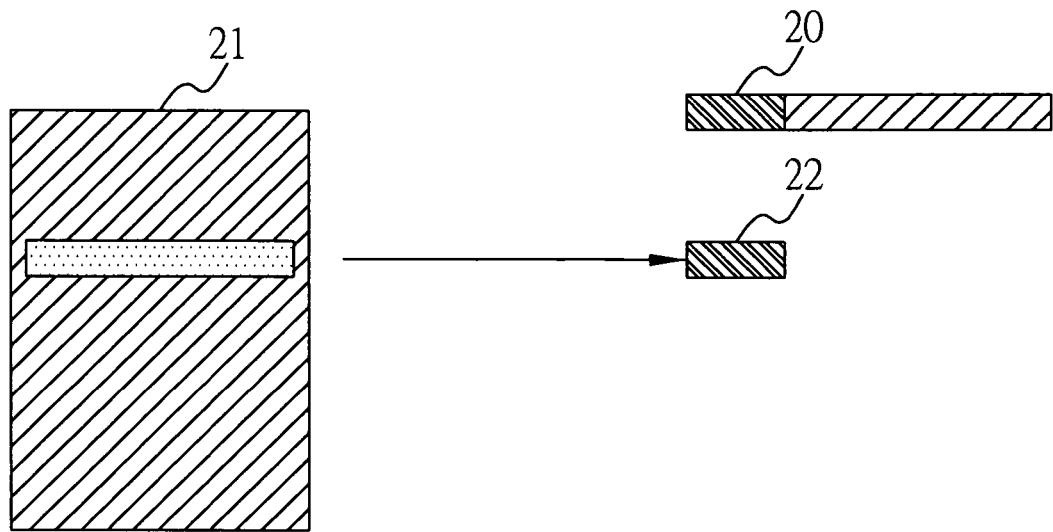

In step S13, a second snapshot process is executed in the computer system, and, as shown in FIG. 4C, the computer system establishes a second index table 22 corresponding to the second snapshot process, so as to identify the second snapshot to be duplicated. So far, the method has executed the snapshot process two times. The method proceeds to step S14.

In step S14, the data in the computer system is changed again by the user. Proceed to step S15.

Figure 4D:
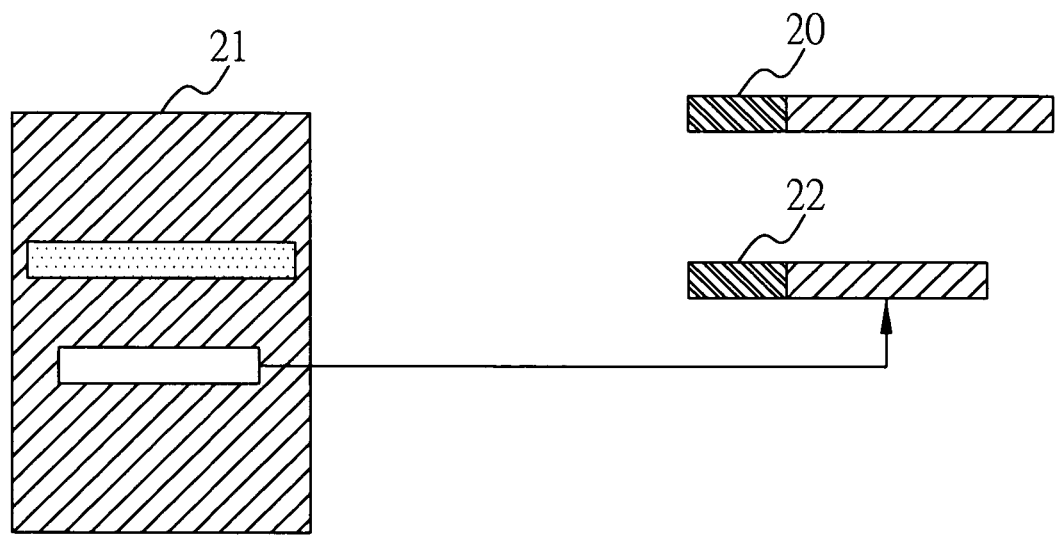

In step S15, which is described with reference to FIG. 4D, the method updates the change of data in the computer system according to the second snapshot. After a user makes another change to the data 21 in a computer system, the computer system proceeds to duplicate a system backup according to the second snapshot corresponding to the data block in the second index table 22 only, without to the data block in the first index table 20. Similarly to the procedure described in step S12 (as shown by the arrow in FIG. 4D), the system backup after the second snapshot is stored in a memory unit. At this time, the performance of the computer system is also not greatly affected since only a system backup is duplicated to correspond to the change made in the second snapshot and only a single snapshot is processed. Next, step S16 is executed.

Figure 4E:
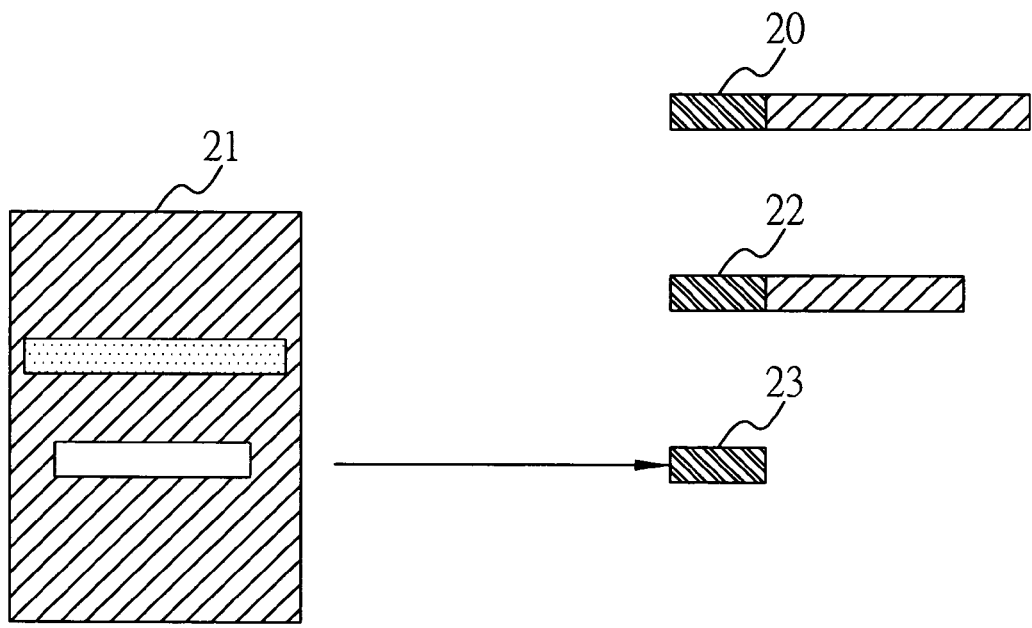
Figure 4F:
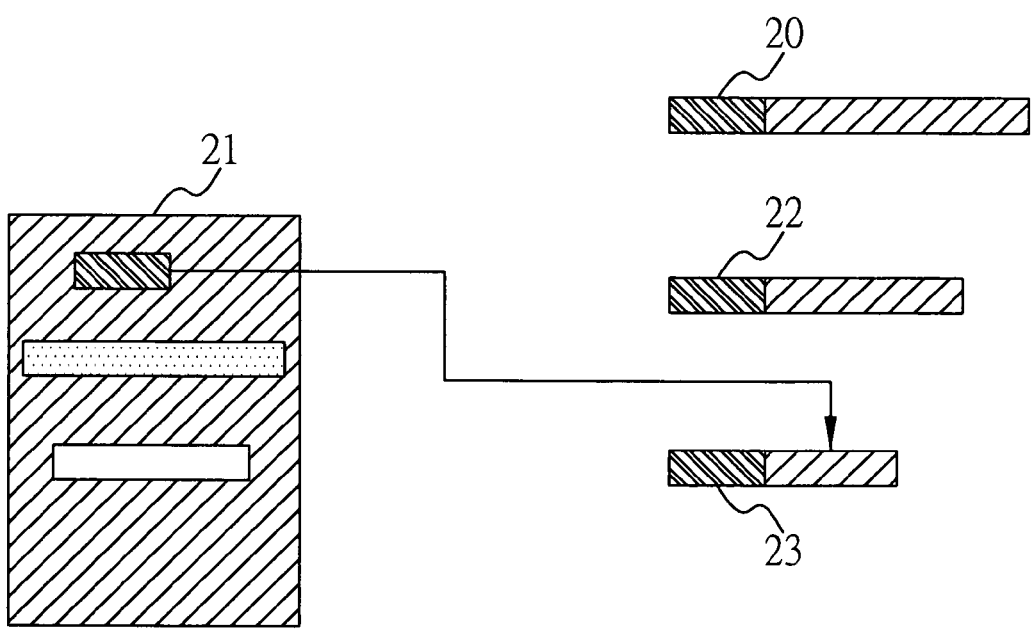

In step S16, a third snapshot process is executed in the computer system by the user, and, as shown in FIG. 4E (that is similar to the snapshot processes depicted in FIG. 4A and FIG. 4C), the computer system establishes a third index table 23 corresponding to the third snapshot process, so as to identify the third snapshot to be duplicated. Subsequently, step S17 is executed.

In step S17, the data in the computer system is changed again by the user, and then step S18 is followed.

Figure 4G:
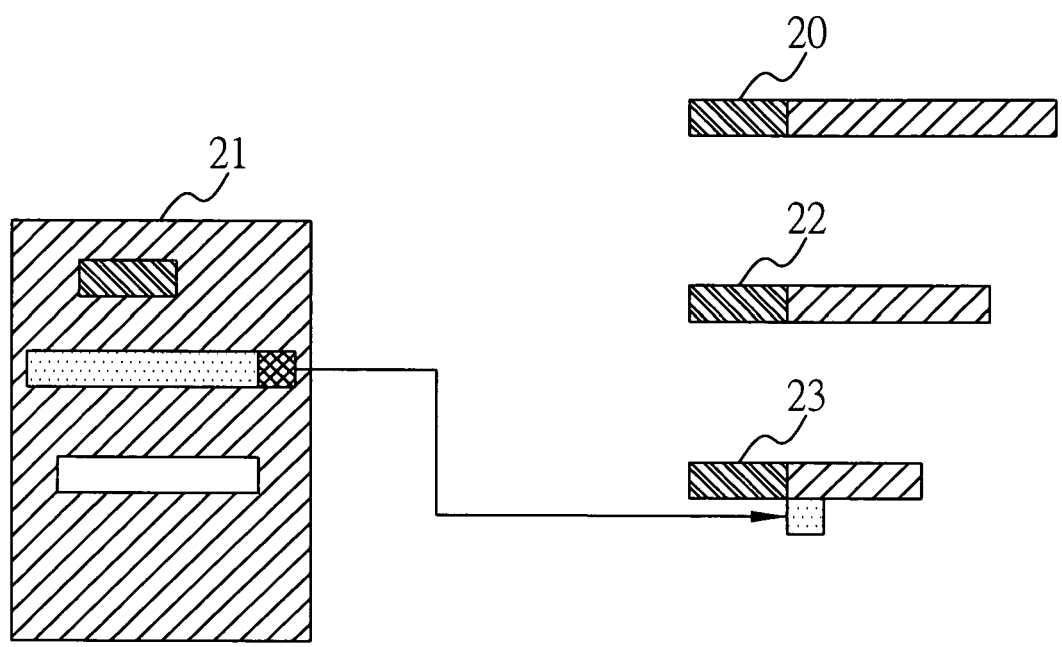

In step S18, control updates the change of data in the system according to the third snapshot. Step S18 is described with reference to FIG. 4F. After a user makes another change to the data 21 in the computer system, the computer system proceeds to duplicate only the system backup according to the third snapshot corresponding to the data block in the third index table. Similar to the procedure described in step S12 (as shown by the arrow in FIG. 4F), the system backup after the last third snapshot is stored in a memory unit. At this time, the performance of the computer system is still not greatly affected since only a system backup is duplicated to correspond to the change made in the third snapshot and only a single snapshot is processed. Accordingly, no matter how many times the user makes changes to the data in the snapshot process, the method updates the changes of data in the latest snapshot process (as shown in FIG. 4G) only, that is the third snapshot process but all of the snapshot processes, such that the performance of the computer system can still be maintained to stabilize system operations, thereby preventing crashes of the computer system for occurring.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method of enhancing system performance applicable to a computer system capable of executing snapshot processes, the method comprising:
   counting a number of times the computer system has executed the snapshot processes; and
   if the number is at least two, updating data made by a latest one of the snapshot processes executed by the computer system with the data that are to be changed in the computer system, instead of updating data made by all of the snapshot processes with the data that are to be changed in the computer system, so as to save system resources and increase the system performance of the computer system.

2. The method of claim 1, wherein the computer system is selected from a group consisting of a notebook computer, a desktop computer, a server and a super computer.

3. The method of claim 1, wherein the snapshot processes are executed by a snapshot mechanism of the computer system.

4. The method of claim 1, further comprising having the latest one of the snapshot processes backup the data that are to be changed in the computer system.

5. The method of claim 4, wherein the backup data are stored in a memory unit.

6. The method of claim 5, wherein the memory unit is selected from a group consisting of a memory of the computer system, a storage device externally connected to the computer system, and a storage space of a network server.

7. A method of enhancing system performance applicable to a computer system capable of executing snapshot processes, the method comprising:
   counting a number of times the computer system has executed the snapshot processes; and
   if the number is at least two, having a latest one of the snapshot processes executed by the computer system backup data that are to be changed in the computer system and updating data made by the latest one of the snapshot processes with the backup data, instead of updating data made by all of the snapshot processes with the backup data, so as to save system resources and increase the system performance of the computer system.

8. The method of claim 7, wherein the computer system is selected from a group consisting of a notebook computer, a desktop computer, a server and a super computer.

9. The method of claim 7, wherein the snapshot processes are executed by a snapshot mechanism of the computer system.

10. The method of claim 7, wherein the backup data are stored in a memory unit.

11. The method of claim 10, wherein the memory unit is selected from a group consisting of a memory of the computer system, a storage device externally connected to the computer system, and a storage space of a network server.

12. A method of enhancing system performance applicable to a computer system capable of executing data backup processes, the method comprising:
   counting a number of times the computer system has executed the data backup processes; and
   if the number is at least two, updating data made by a latest one of the data backup processes executed by the computer system with the data that are to be changed in the computer system, instead of updating data made by all of the data backup processes with the data that are to be changed in the computer system, so as to save system resources and increase the system performance of the computer system.

13. The method of claim 12, wherein the computer system is selected from a group consisting of a notebook computer, a desktop computer, a server and a super computer.

14. The method of claim 12, wherein the data backup processes are executed by a snapshot mechanism installed in the computer system.

15. The method of claim 12, further comprising having the latest one of the data backup processes backup the data that are to be changed in the computer system.

16. The method of claim 15, wherein the backup data are stored in a memory unit.

17. The method of claim 16, wherein the memory unit is selected from a group consisting of a memory of the computer system, a storage device externally connected to the computer system, and a storage space of a network server.

18. A method of enhancing system performance applicable to a computer system capable of executing snapshot processes, the method comprising:
   counting a number of times the computer system has executed the snapshot processes; and
   if the number is at least two, updating data made by a latest one of the snapshot processes executed by the computer system with the data that are to be changed in the computer system, without updating data made by another of the snapshot processes with the data that are to be changed in the computer system, so as to save system resources and increase the system performance of the computer system.

* * * * *